United States Patent [19]

Durboraw, III

[11] Patent Number: 5,095,538

[45] Date of Patent: Mar. 10, 1992

[54] CALIBRATED METHOD AND DEVICE FOR NARROW BAND DOPPLER COMPENSATION

[75] Inventor: I. Newton Durboraw, III, Scottsdale, Ariz.

[73] Assignee: Motorola, Inc., Schaumburg, Ill.

[21] Appl. No.: 414,494

[22] Filed: Sep. 29, 1989

[51] Int. Cl.⁵ .............................................. H04B 7/01
[52] U.S. Cl. ...................................... 455/71; 455/316; 370/104.1
[58] Field of Search ........................ 455/52, 65, 71, 99, 455/63, 316, 317, 343; 331/1 A; 342/99, 418; 375/1, 98; 370/104.1

[56] References Cited

U.S. PATENT DOCUMENTS

| | | | |
|---|---|---|---|
| 3,068,416 | 12/1962 | Meyer | 455/61 |
| 3,182,259 | 5/1965 | Holder | 455/71 |
| 3,364,311 | 1/1968 | Webb | 370/120 |
| 4,385,401 | 5/1983 | Jagnow et al. | 455/333 |
| 4,513,429 | 4/1985 | Roeder | 375/98 |
| 4,689,806 | 8/1987 | Von Der Embse | 370/104.1 |
| 4,726,069 | 2/1988 | Stevenson | 455/71 |
| 4,872,164 | 10/1989 | Rieger | 370/104.1 |
| 4,903,279 | 2/1990 | Murakami et al. | 375/1 |

Primary Examiner—Curtis Kuntz
Assistant Examiner—Edward Urban
Attorney, Agent, or Firm—Frank J. Bogacz

[57] ABSTRACT

A Doppler compensating device which conserves power and can be used with hand-held communication devices comprises a phase lock loop for tracking a Doppler phase offset and a Doppler offset calibration loop which generates a Doppler offset curve. The Doppler offset calibration loop extracts Doppler offset points from the phase lock loop, and from these points calibrates a set of three parameters defining the Doppler offset curve using an estimation algorithm such as the least squares algorithm. After the curve is defined, the compensation device extracts points from the Doppler offset curve and deactivates the phase lock loop. This process preserves power within the hand-held communication devices.

10 Claims, 3 Drawing Sheets

TYPICAL DOPPLER FREQUENCY
OFFSET CHARACTERISTICS (L=400 MILES)

CONSTANT VELOCITY MODEL
FOR DOPPLER COMPENSATION

DOPPLER PREDICTION UNCERTAINTY
L=400 MILES; 7 SAMPLES • 1.0 SEC SPACING

CALIBRATED METHOD AND DEVICE FOR NARROW BAND DOPPLER COMPENSATION

CROSS REFERENCE TO RELATED APPLICATIONS

The present application is related to co-pending U.S. patent applications Ser. Nos. 263,849, Satellite Cellular Telephone and Data Communication System, 402,743, Power Management System For A Worldwide Multiple Satellite Communications System, 415,814, Multiple Beam Deployable Space Antenna System, 415,842, Telemetry, Tracking and Control For Satellite Cellular Communication Systems, and 415,815, A Method To Optimize Cell-To-Cell Handoffs In A Satellite Cellular System.

BACKGROUND OF THE INVENTION

This invention relates, in general, to Doppler compensation, and more specifically, to calibration of Doppler within a narrow bandwidth.

Satellites are becoming important links for communication between stations at different locations throughout the world, particularly for mobile communication units. Such mobile communication units, particularly hand held communication units, inherently operate on low power. To operate with low power, the hand-held communication units must be designed for narrow band signals for efficiency. Typical applications for narrow band designs include hand-held units which must communicate with low orbiting satellites (e.g. approximately 400 n. mi.).

The Doppler effect on signals transmitted between a mobile communication unit and a satellite becomes distorted, particularly for low-earth-orbiting satellites. The distortion caused by Doppler must be removed for the information to be extracted when the communication channel is narrow (e.g. 3 Khz). For instance, a signal transmitted to earth from a low orbiting satellite would have a frequency variation due to Doppler of ±35 Khz at a center frequency of 1.5 Ghz over a period of 10 to 15 minutes. Voice channels of 3 Khz would require guard band of approximately 12 channel widths between voice/data channels to avoid interference between channels. When the channel width is even smaller, as with pagers having a band width of 300 Hz, the guard band increases to over 200 channel widths.

The problem of guard band width may be overcome by transmitting a pilot signal or control signal in a single dedicated channel. The control signal must be sufficiently separated from the voice/data signals that the voice/data signals do not interfere with the control signal. Terrestrial receivers search for the control signal, and use the control signal to direct data traffic for the other channels. By separating the control signal from all other signals, the Doppler effect on the control signal can be determined and applied to the voice/data channels. This avoids tracking Doppler on the voice/data channels.

Continuous tracking of the control signal to obtain Doppler requires a continuous supply of power. For low-power hand-held units, such as pagers and hand-held cellular telephones, continuous tracking of Doppler is inefficient and undesirable.

SUMMARY OF THE INVENTION

Accordingly, it is an object of the present invention to provide a Doppler compensating device which does not require continuous tracking of Doppler, and permits operating with minimal power.

A Doppler compensating device whhich conserves power and can be used with hand-held communication devices comprises a phase lock loop for tracking a Doppler phase offset and a Doppler offset calibration loop which generates a Doppler offset curve. The Doppler offset calibration loop extracts Doppler offset points from the phase lock loop, and from these points calibrates a set of three parameters defining the Doppler offset curve using an estimation algorithm such as the least squares algorithm. After the curve is defined, the compensating device extracts points from the Doppler offset curve and deactivates the phase lock loop. This process preserves power within the hand-held communication devices.

The above and other objects, features, and advantages of the present invention will be better understood from the following detailed description taken in conjunction with the accompanying drawings.

DETAILED DESCRIPTION OF THE INVENTION

The following U.S. patent applications are related to the present invention, and the teachings of the applications are hereby incorporated by reference:

U.S. patent application Ser. Nos. 263,849, Satellite Cellular Telephone and Data Communication System, 402,743, Power Management System For A Worldwide Multiple Satellite Communications System, 415,814, Multiple Beam Deployable Space Antenna System, 415,842, Telemetry, Tracking and Control For Satellite Cellular Communication Systems, and 415,815, A Method To Optimize Cell-To-Cell Handoffs In A Satellite Cellular System.

The present invention is particularly applicable to low-power, hand-held communication units such as paging devices and hand-held cellular telephones. However, the invention may also be applied to high-power communication units experiencing Doppler effects.

Figure 1:
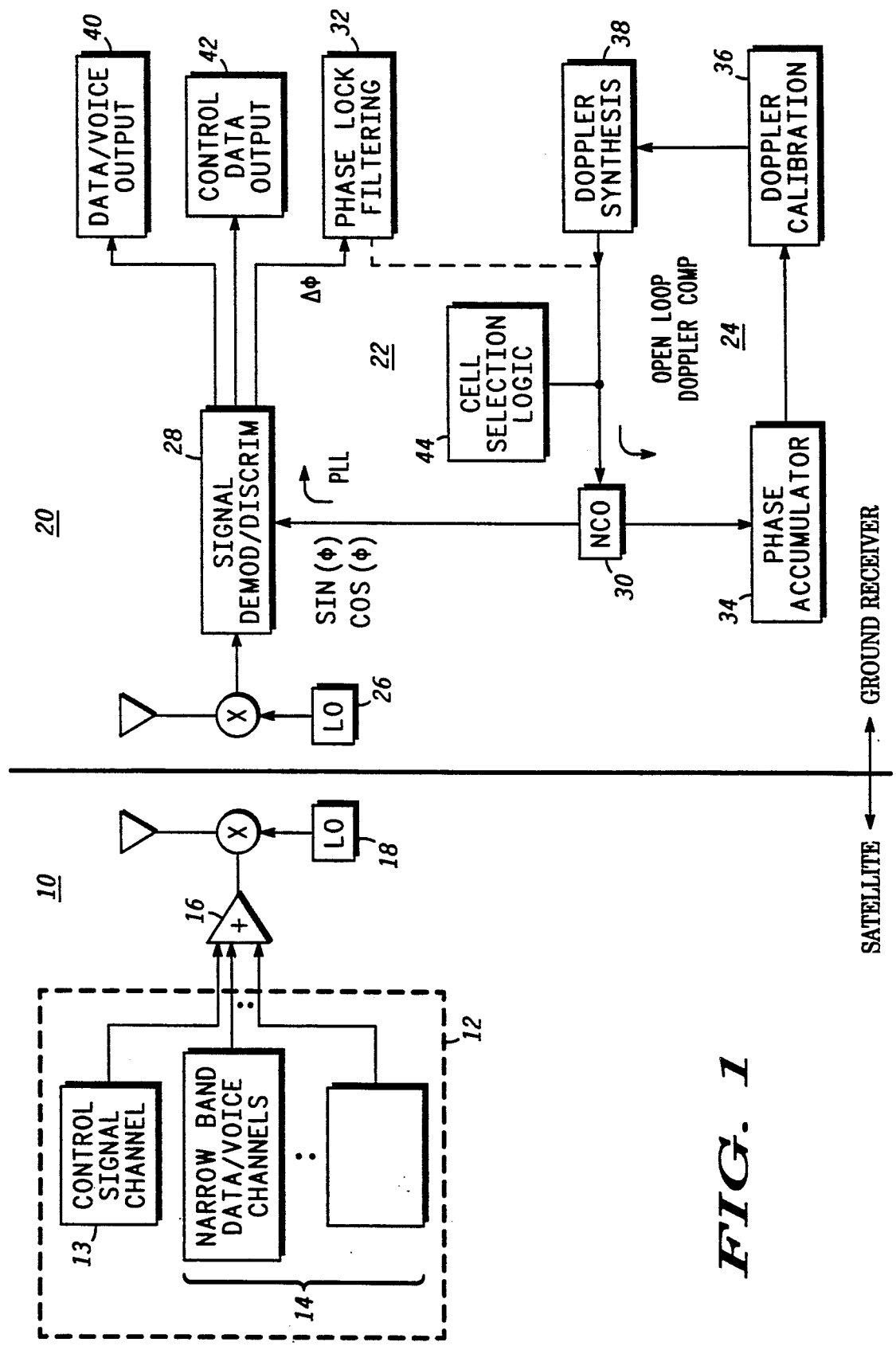
FIG. 1 is a block diagram of Doppler compensating device according to the present invention.

To reduce power consumption within the hand-held unit, the present invention incorporates two Doppler defining loops within a receiver 20 as shown in FIG. 1. The first loop, a phase locked loop (PLL) 22, initially tracks the Doppler in signals received from a transmitter 10. The second loop, labelled open loop Doppler compensation (OLDC) 24, samples phase errors from PLL 22 to determine a Doppler curve, and uses the curve to define the Doppler for subsequently received signals. Open loop Doppler compensation 24 requires minimal power and allows PLL 22 to turn off.

The specific elements of transmitter 10 comprise a plurality of channels 12 where a first channel 13 is dedicated specifically to a control signal, and voice/data channels, designated 14, are used for voice/data signals. All channels of plurality of channels 12 are summed in summing amplifier 16, and the output of summing amplifier 16 is mixed with a carrier from local oscillator (LO) 18. This modulated signal is transmitted to receiver 20. It should be recognized that the control signal of first channel 13 determines the data flow of voice/data channels 14 within receiver 20. The control signal also operates as a pilot tone to allow tracking of the Doppler by receiver 20.

When the modulated signal from transmitter 10 is received by receiver 20 it is demodulated by LO 26, and the I and Q baseband signals are relayed to signal demodulator/discriminator (dem/disc) 28. Dem/disc 28 multiplies the I and Q baseband signals with sine and cosine signals received from a numerically controlled oscillator (NCO) 30. The output of signal dem/disc 28 is the phase error $\Delta\phi$ which is filtered through phase lock filter 32. Phase lock filter 32 outputs a measure of the loop phase error, $\Delta\phi$, to NCO 30 to control the output of NCO 30. Demo/disc 28, phase lock filter 32, and NCO 30 constitute PLL 22.

Since the satellite of transmitter 10 is constantly moving, the Doppler on the signal received by receiver 20 is constantly changing. While PLL 22 is active, PLL 22 will lock onto the phase of the input signal and track the Doppler as it changes. The correction sine and cosine signals generated by NCO 30 are used within demo/disc 28 to correct the signals from voice/data channels 14 for Doppler effects.

Figure 2:
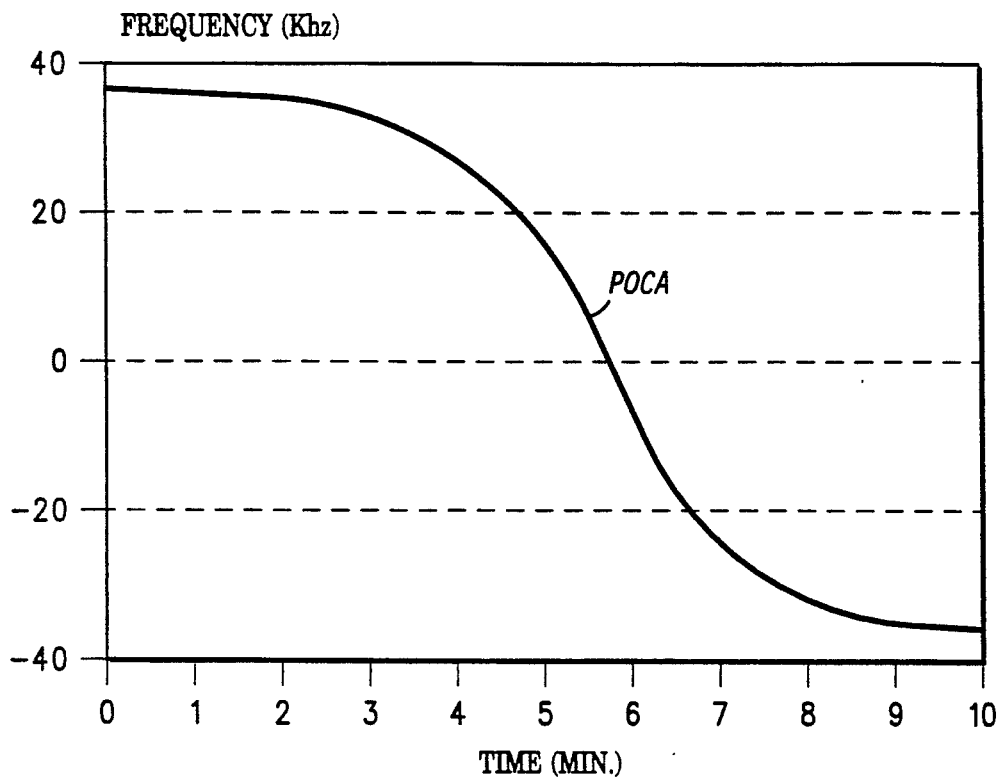
FIG. 2 is a Doppler frequency offset curve for given parameters.

As PLL 22 tracks the changing Doppler, a phase accumulator 34 within OLDC 24 samples the amplitudes of the $\Delta\phi$ generated by phase lock filter 32. Each sample is transmitted to a Doppler calibration 36. After several samples have been taken and transmitted to Doppler calibration 36, preferably about 7 samples taken at one second intervals, Doppler calibration 36 uses the samples in an algorithm to generate a predicted Doppler curve for the particular satellite being tracked. FIG. 2 represents a Doppler curve generated by Doppler calibration 36 for a satellite having an orbit 400 miles above the earth. Typically a satellite used to, is tracked for approximately 10 minutes. At the beginning and ending reaches of the tracking period, the Doppler effect on the signals is greatest. As the satellite passes through a point of closest approach (POCA), the Doppler effect is at its lowest.

Referring again to FIG. 1, points along the curve generated by Doppler calibration 36 are extracted by Doppler synthesis 38 and Doppler synthesis 38 generates a voltage representing the magnitude of each extracted point. Since the time of initial tracking is known, and the Doppler curve is defined according to the initial point of tracking, Doppler synthesis 30 can correspond points extracted from the curve with signals received from transmitter 10. The voltage generated by Doppler synthesis is relayed to NCO 30 to control the values of the sine and cosine outputs of NCO 30.

As Doppler synthesis 38 begins to extract points from the Doppler curve, PLL 22 is no longer needed to track the curve. Therefore, the power to PLL 22 is turned off. This reduces the power usage within receiver 20.

Figure 3:
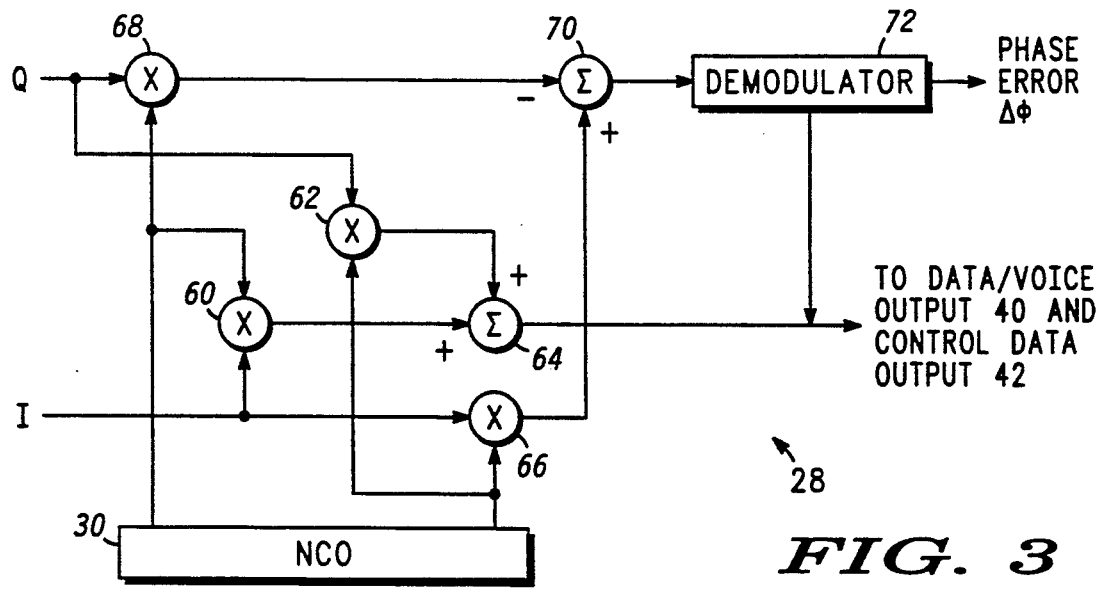
FIG. 3 is a diagram of a signal demodulator/discriminator for the Doppler compensating device of FIG. 1.

FIG. 3 is a detailed schematic of demo/disc 28. As seen in FIG. 3, NCO 30 generates a Doppler offset frequency, represented by the cosine and sine outputs, which are relayed to demo/disc 28. In demo/disc 28, a first portion of the cosine and sine signals are multiplied in mixers 60 and 62 respectively, with a first portion of the I and Q components of the voice/data signals and the control signal. Since the cosine and sine signals generally represent the Doppler phase error within the signals, the result is Doppler compensated data signals. The corrected I and Q components are recombined in summer 64 and the signals corresponding to data/voice channels 14 are output at data/voice output 40 of FIG. 1. Similarly, the signals corresponding to control signal channel 13 are output to control data output 42 of FIG. 1.

A second portion of the sine value received from NCO 30 is multiplied in multiplier 66 with a second portion of the I component of the control signal. A second portion of the cosine value is multiplied in multiplier 68 with a second portion of the Q component of the control signal within demo/disc 28. The I and Q components are then recombined in summer 70. The combined signal from summer 70 is multiplied in demodulator 72 with the corrected voice/data signals from summer 64 to form the phase error $\Delta\phi$ which is used within PLL 22.

Figure 4:
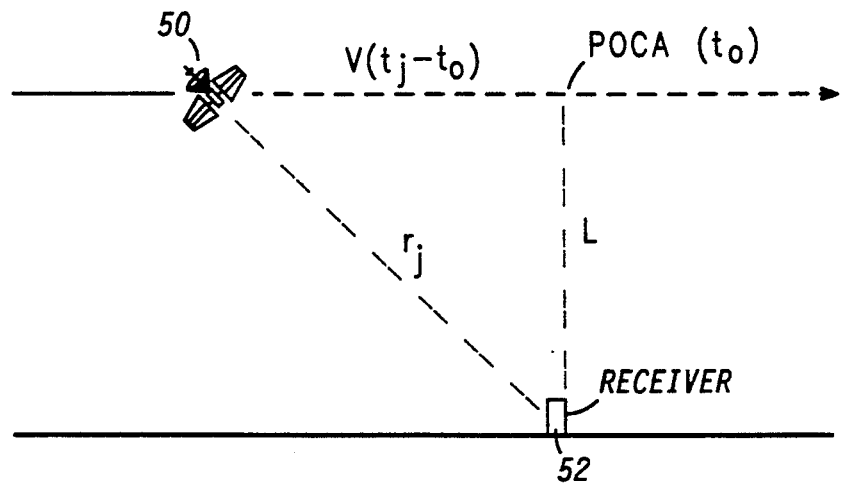
FIG. 4 is a diagram of a simplied model of a low-orbit satellite system showing a satellite communicating with a terrestrial receiver.

The predicted Doppler/time-dependent frequency offset to generate the curve of FIG. 2 is determined by modeling the satellite motion with 2 parameters, L and $t_o$ where L is the range to the satellite at POCA and $t_o$ is time at POCA. Referring now to FIG. 4, satellite 50 has a known velocity, V, at a distance L from receiver 52 at POCA, $t_o$. The instantaneous range of satellite 50 at any point along its flight is $r_j$. This instantaneous range includes situations where satellite 50 does not travel directly over receiver 52. The range of satellite 50 from receiver 52 at some time $t_j$ is defined by:

$$r_j = [L^2 + V^2(t_j + t_o)^2]^{\frac{1}{2}} \quad (1)$$

The observed carrier phase at $t_j$ is expressed in terms of the combined effect of the range and the accumulated phase due to frequency offset $\delta f_o$:

$$\widetilde{\rho}_j = r_j + \lambda \delta f_o(t_j - t_o) + w_j, \ (j=1,2,3,\ldots n) \quad (2)$$

where:
  $\lambda$ = wavelength of transmission
  $\delta f_o$ = Local oscillator frequency offset (which is modeled as a constant) of receiver 52 relative to satellite 50
  $w_j$ = noise in measurement of the carrier phase.

Given a set of observations $\rho_j$, (j=1, 2, 3, . . . n), as accumulated by phase accumulator 34 of FIG. 1, the three characteristic parameters of the Doppler curve are L, $\delta f_o$, and $t_o$, and can be estimated. V is not estimated since V is well established as an orbital parameter.

The most direct method for estimating L, $\delta f_o$, and $t_o$ is the iterative least squares estimation method. An initial estimate is used to compute an estimated set of observations by:

$$\begin{aligned}
\hat{\rho}_j &= \hat{r}_j + \lambda \delta \hat{f}_o(t_j - \hat{t}_o) \\
&= (\hat{L}^2 + V^2(t_j - \hat{t}_o)^2)^{\frac{1}{2}} + \lambda \delta \hat{f}_o(t_j - \hat{t}_o)
\end{aligned} \quad (3)$$

$$j = 1, 2, 3, \ldots n$$

where the hat ($\wedge$) denotes an estimated quantity. The least squares estimate is formed by iteratively computing a three dimensional correction vector, $\delta \hat{x}$, whose elements are $\delta \hat{f}_0$, $\delta \hat{L}$, and $\delta \hat{t}_0$, from the equation:

$$\delta \hat{x} = \left[\sum_{j=1}^{n} h_j h_j^T\right]^{-1} \left[\sum_{j=1}^{n} h_j(\widetilde{\rho}_j - \hat{\rho}_j)\right] \quad (4)$$

where $h_j$ and its transpose $h_j^T$ are sensitivity vectors. The tilde ($\sim$) denotes a measured quantity. The product of the vectors $h_j$ and $h_j^T$ form a 3-by-3 matrix (commonly referred to as a dyadic) whose elements are:

$$[h_j h_j^T] = \begin{pmatrix} h_1 h_1 & h_1 h_2 & h_1 h_3 \\ h_2 h_1 & h_2 h_2 & h_2 h_3 \\ h_3 h_1 & h_3 h_2 & h_3 h_3 \end{pmatrix}$$

The sensitivity vectors $h_j$ are defined as follows:

$$h_j = \begin{pmatrix} (t_j - \hat{t}_0)\lambda \\ L/r_j \\ -\delta \hat{f}_o \lambda - (t_o - \hat{t}_o)\hat{V}^2/\hat{r}_j \end{pmatrix} \quad (5)$$

Having solved for $\delta x$, the parameters of the Doppler curve are updated with the vector equation:

$$x_{new} = x_{old} + \delta \hat{x} \quad (6)$$

where $x_{new}$ and $x_{old}$ are 3 dimensional vectors whose elements are the new and old iterative estimates of the quantities L, $\delta f_o$, and $t_o$, respectively. The iteration process ends when $\delta \hat{x} = 0$.

The accuracy of the Doppler curve estimates are dependent upon the first observations of the satellite trajectory relative to POCA and can be assessed using through covariance analysis. One familiar with the least squares estimation will recognize that the error covariance of the estimate of Equation 4 is expressed as a covariance matrix P where $$P = \epsilon\{[\delta \hat{x} - \delta x][\delta \hat{x} - \delta x]^T\} = \left[\sum_{j=1}^{n} h_j h_j^T\right]^{-1} \sigma_\phi^2 \quad (7)$$

where $\epsilon\{\}$ is the expectation operator and $\theta_\phi$ is the one sigma random error expected in the measurement of the signal phase for the receiver.

The error covariance matrix, P, is a 3-by-3 matrix charaterizing the uncertainty in estimating the three parameters of the Doppler curve. Since the parameters are used to define the predicted Doppler offset during the entire observation period, the uncertainty of the Doppler curve may be evaluated at representative points along the observation period.

The Doppler predicted offset frequency for the $k^{th}$ time point (ie. not limited to the first n points used in Equation 4) is computed from the time derivative of the observed signal phase (Equation 2) as $$\delta \hat{f}_k = \hat{\rho}_k/\lambda = [\lambda \delta \hat{f}_o + V^2(t_k - \hat{t}_o)/\hat{r}_k]/\lambda \quad (8)$$

The subscript k used here is distinct from the j used in the calibration of the Doppler parameters.

The error in the Doppler offset is defined as the perturbation of Equation 8 and is $$\delta(\delta \hat{f}_k) = \delta \hat{\rho}_k/\lambda = \beta_k^T(\delta \hat{x} - \delta x) \quad (9)$$

where $\beta$ is the three dimensional perturbation sensitivity vector:

$$\beta_k = \begin{pmatrix} 1 \\ -V^2 L(t_k - t_o)/(\lambda r_k^3) \\ -(V^2/r_k)[1 - V^2(t_k - t_o)^2/r_k^2]/\lambda \end{pmatrix}$$

By combining Equations 9 and 7, the variance of the error in the Doppler offset is expressed as $$\sigma_{\delta f k} = [\beta_k^T P \beta_k]^{\frac{1}{2}} \quad (10)$$

Figure 5:
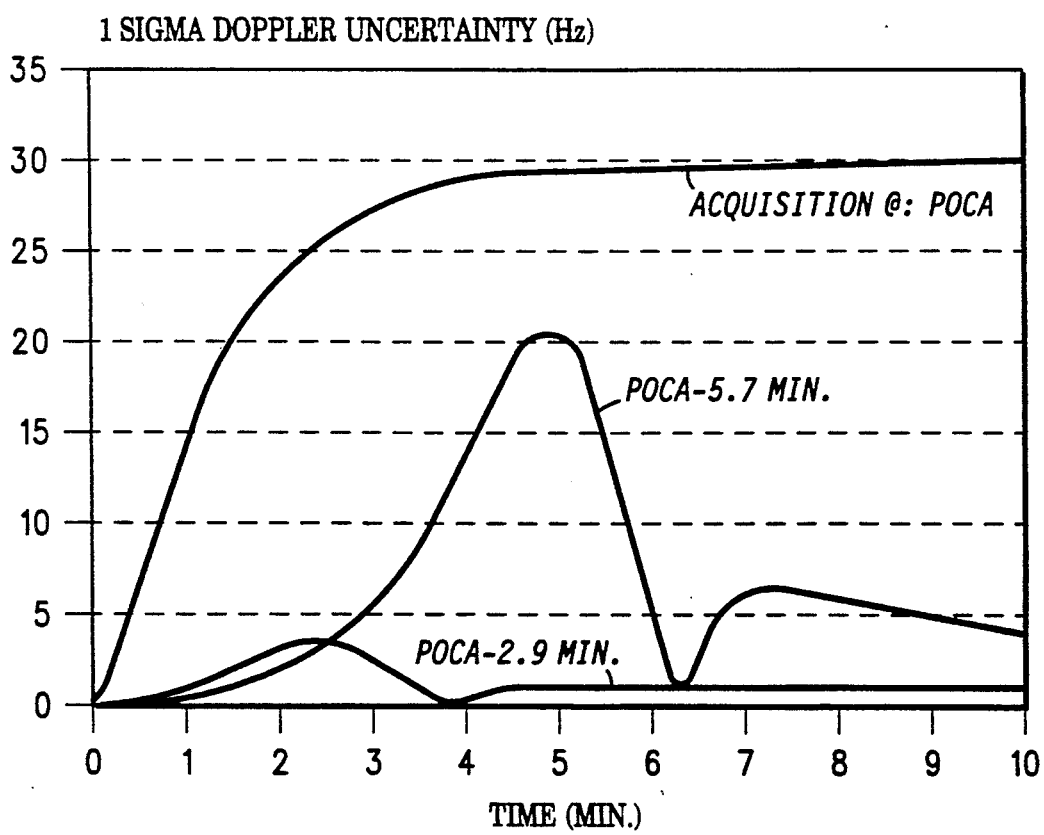
FIG. 5 is a graph representing calibration error for three acquisition times according to the present invention.

This function may be evaluated for a range of configurations to demonstrate the feasibility of calibrating the Doppler characteristics based on a very short sample of the signal received from the control signal channel 13 of FIG. 1. FIG. 5 graphically represents Doppler uncertainty vs. time for samples taken 5.7 minutes before POCA, 2.9 minutes before POCA, and at POCA. The graph assumes calibration points taken over a span of 6 seconds, with acquisition and Doppler calibration occuring at three different points during the pass of a satellite orbiting at 400 miles. In general, the longer the data span, the more accurate the calibration of the Doppler curve. As indicated in FIG. 5, with 7 samples spanning a period of 6 seconds, the entire Doppler curve can be predicted to within 10 percent of a pager bandwidth of 300 Hz. More favorable results occur when acquisition occurs at 2.9 minutes prior to POCA. The prediction accuracy becomes slightly degraded at POCA.

Referring again to FIG. 1, a cell selection logic 44 is coupled to the input of NCO 30. The amplitude of the voltage received at this point represents the phase error $\Delta \phi$. This value, due to its changing nature resulting from the movement of the satellite, can be used to determine when a signal transmitted or received within a particular cell must be transferred to an adjoining cell. The cell-to-cell handoff is discussed in the previously referred to application "A Method To Optimize Cell-To-Cell Handoffs In A Satellite Cellular System."

Thus there has been provided, in accordance with the present invention, a calibrated method and device for narrow band Doppler compensation that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A low-power Doppler compensating device comprising:
   first means for tracking a dynamic Doppler phase shift from an input signal to generate a first Doppler correction signal;
   said input signal having a Doppler phase shift due to predictable relative motion between a transmitter and a receiver;

second means for generating a Doppler offset curve for a dynamic Doppler phase shift, said second means generating a second Doppler correction signal;

said second means coupled to said first means to receive a set of Doppler phase shift samples to calibrate said Doppler offset curve;

third means for removing said Doppler phase shift from said input signal, said third means coupled to said first means and to said second means; and said third means receiving said first Doppler correction signal for a given time, after which said third means receives said second Doppler correction signal.

2. A low-power Doppler compensating device according to claim 1 wherein said first means for tracking comprises a phase lock loop.

3. A low-power Doppler compensating device according to claim 1 wherein said second means for generating comprises an open loop time dependent compensator.

4. A low-power Doppler compensating device according to claim 3 wherein said second means for generating comprises:

accumulator means for extracting said set of Doppler phase shift samples from said first means, said accumulator means accumulating said extracted set of Doppler phase shift samples;

calibration means for generating calibration parameters representing said Doppler offset curve from said set of Doppler phase shift samples, said calibration means coupled to said accumulator means to receive said accumulated extracted set of Doppler phase shift samples;

synthesis means for extracting said calibration parameters representing said Doppler offset curve, said synthesis means coupled to said calibration means to extract said calibration parameters;

said synthesis means generating frequency estimates from said calibration parameters;

numerically controlled oscillator (NCO) coupled to said synthesis means to receive said frequency estimates, said NCO generating said second Doppler correction signal from said frequency estimates; and said NCO coupled to said third means to relay said second Doppler correction signal to said third means and said NCO coupled separately to said accumulator means.

5. A low-power Doppler compensating device according to claim 1 wherein said second means for generating comprises:

accumulator means for extracting said set of Doppler phase shift samples from said first means, said accumulator means accumulating said extracted set of Doppler phase shift samples;

calibration means for generating calibration parameters representing said Doppler offset curve from said set of Doppler phase shift samples, said calibration means coupled to said accumulator means to receive said accumulated extracted set of Doppler phase shift samples;

synthesis means for extracting said calibration parameters representing said Doppler offset curve, said synthesis means coupled to said calibration means to extract said calibration parameters;

said synthesis means generating frequency estimates from said calibration parameters;

numerically controlled oscillator (NCO) coupled to said synthesis means to receive said frequency estimates, said NCO generating said second Doppler correction signal from said frequency estimates; and said NCO coupled to said third means to relay said second Doppler correction signal to said third means and said NCO coupled separately to said accumulator means.

6. A low-power Doppler compensating device according to claim 1 wherein said third means comprises a signal demodulator/discriminator.

7. A method for adjusting an input signal for Doppler offset comprising the steps of:

tracking the Doppler offset in a phase lock loop (PLL);

generating a Doppler correction signal within said PLL;

modulating said Doppler correction signal with said input signal;

extracting and storing Doppler phase shift samples from said PLL;

generating calibration parameters defining a Doppler offset curve;

synthesizing frequency estimates from said calibration parameters;

generating a frequency command from said frequency estimates;

generating said Doppler correction signal from said frequency command;

deactivating said PLL; and modulating said input signal with said Doppler correction signal.

8. A method of adjusting an input signal for Doppler offset according to claim 7 wherein said step of generating calibration parameters defining a Doppler offset curve comprises the step of calculating said calibration parameters using a least squares algorithm.

9. A method for adjusting an input signal for Doppler offset according to claim 8 wherein said step of calculating said calibration parameters using a least squares algorithm comprises:

calculating a Doppler estimate using the algorithm $$\hat{\rho}_j = \hat{r}_j + \lambda \delta \hat{f}_d(t_j - \hat{t}_o)$$
$$= (\hat{L}^2 + \hat{V}^2(t_j - \hat{t}_o)^2)^{\frac{1}{2}} + \lambda \delta \hat{f}_d(t_j - \hat{t}_o)$$

$$j = 1, 2, 3, \ldots n;$$

calculating sensitivity vectors using the algorithm $$h_j = \begin{pmatrix} (t_j - \hat{t}_o)\lambda \\ \hat{L}/\hat{r}_j \\ -\delta \hat{f}_d \lambda - (t_o - \hat{t}_o)\hat{V}^2/\hat{r}_j \end{pmatrix};$$

calculating a correction vector using the algorithm $$\delta \hat{x} = \left[ \sum_{j=1}^{n} h_j h_j^T \right]^{-1} \left[ \sum_{j=1}^{n} h_j(\tilde{\rho}_j - \hat{\rho}_j) \right];$$

calcualting a new value of x using the algorithm $x_{new} = x_{old} + \delta \hat{x}$; and iterating from the step of calculating a Doppler estimate until $\delta \hat{x} = 0$.

10. A method for adjusting an input signal for Doppler offset according to claim 7 wherein said step of synthesizing frequency estimates comprise the step of compensating a receiver reference frequency from a predicted offset frequency using the algorithm $$\delta \hat{f}_k = \hat{\rho}_k/\lambda = [\lambda \hat{\delta f_o} + V^2(t_k - \hat{t_o})/\hat{r}_k]/\lambda.$$

* * * * *